UNITED STATES PATENT OFFICE.

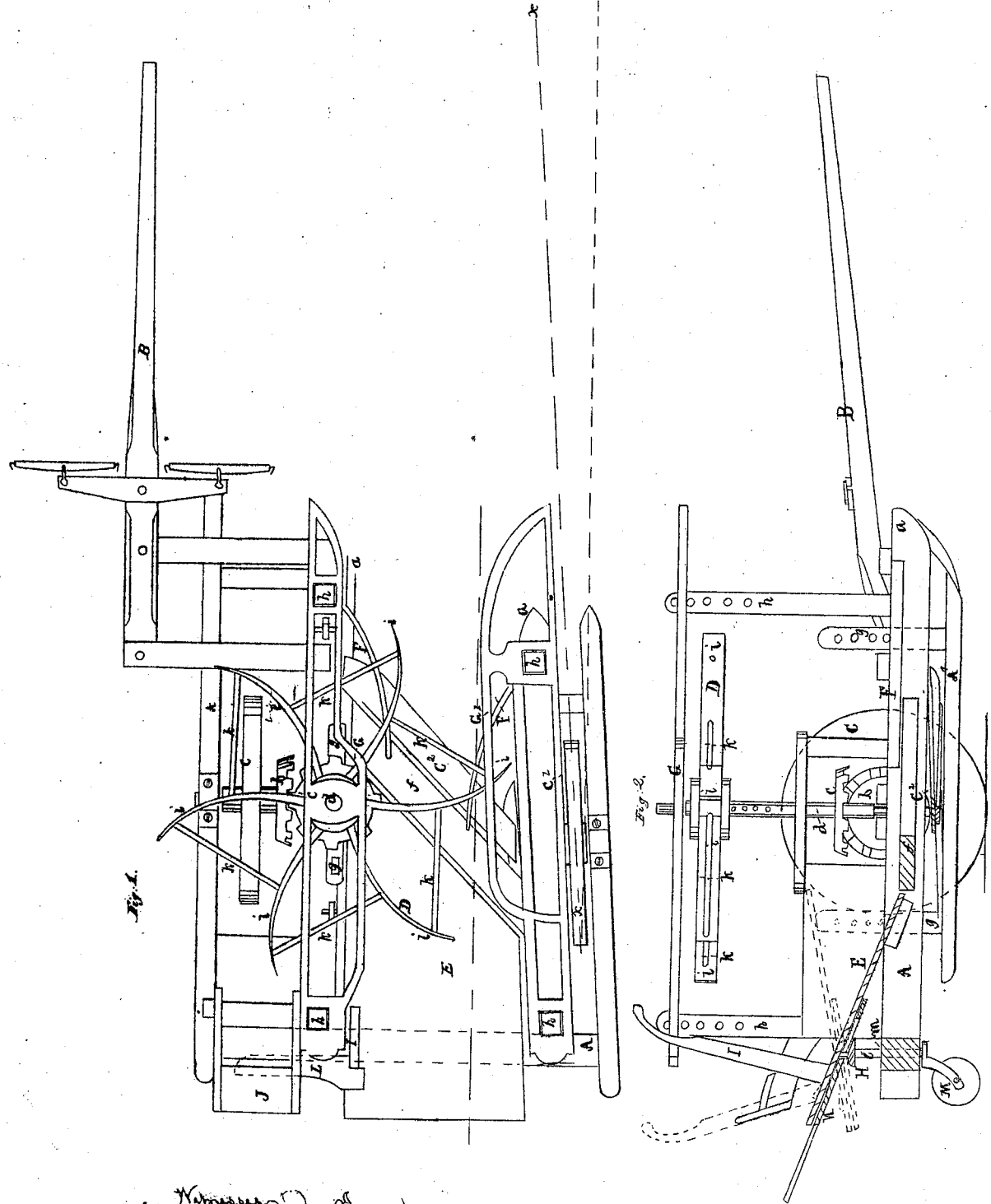

ISAAC REAMER AND HENRY MILLER, OF CONRAD'S STORE, VIRGINIA.

IMPROVEMENT IN CORN-HARVESTERS.

Specification forming part of Letters Patent No. 23,783, dated April 26, 1859.

*To all whom it may concern:*

Be it known that we, ISAAC REAMER and HENRY MILLER, of Conrad's Store, in the county of Rockingham and State of Virginia, have invented a new and useful Improvement in Corn-Harvesters; and we do hereby declare that the following is a full, clear, and exact description of the same, reference being had to the accompanying drawings, forming a part of this specification, in which—

Figure 1 represents a plan of a corn-harvester constructed according to our improvement, and Fig. 2 a longitudinal vertical section thereof.

Similar letters of reference in each of the several figures indicate corresponding parts.

The nature of our invention consists, first, in the combination of adjustable upper guides with an adjustable reel; second, in a peculiar construction of the reel, in combination with the platform, as described, to avoid the wrapping of the corn round the reel-shaft and insure its straight delivery on the platform; third, in the combination of upper and lower cross-bars to the knife and adjustable cutter-frame to vary the height of cut and to protect the knife from weight of corn; fourth, in giving to the platfrom a novel double adjustability, also in the manner of effecting the one adjustment, and likewise in constructing the platform so that it may be extended or contracted at pleasure in the rear; fifth, in counteracting the side pull on the draft as produced by an oblique cutter on one side of the draft by setting the carrying-wheel farthest from the draft to turn inwardly toward the front, or to have such inclination by reason of its set, as hereinafter specified.

To enable others skilled in the art to make and use our invention, we will proceed to describe its construction and operation.

A is the frame of the machine, constructed in any suitable manner, and having lower dividers, $a\ a$, in front, one of which is situated on the draft side and arranged to project in advance of the other.

B is the draft-bar, and C C' the side carrying-wheels. The one, C', of these wheels which is on the side farthest from the draft is set so as to run inwardly toward the line of draft in front, as shown by the red line $x\ x$ in Fig. 1, so as to neutralize or reduce the tendency of the machine to turn or strain to the one side by the resistance of the corn on the machine at one side of the draft, operating in conjunction with the oblique set or arrangement of the knife or cutter $C^2$, which slopes from the lines of draft backwardly toward the standing corn. Such set of the one wheel C' thus counteracts not one merely but two influencing causes to divert the machine from running parallel to the draft. By this arrangement fatiguing side pull or jerk on the animal or cattle drawing such machine is most materially lessened or removed. The other C of these side running-wheels has a bevel-pinion, $b$, on its shaft meshing into a bevel-gear, $c$, on the reel-shaft $d$ to rotate the reel D by the run of the machine.

The obliquely-set knife $C^2$ has the usual under brace or strip, $e$, connecting the two sides of the frame by or through the intervention, in the present instance, of an under frame, A', joined to the main frame A by perforated uprights $g\ g$, passing through slots in the main frame, and serving through removable cross-pins or their equivalents to make the under frame adjustable for the purpose of elevating, lowering, or adjusting the knife to cut high or low at pleasure. Above the knife, in its rear, and between the knife and platform E, is another frame-tie or cross-bar, $f$, of similar obliquity to the knife, or thereabout. These upper and lower cross-bars, $e\ f$, not merely serve to brace the frame of the machine, but they relieve the knife of much of the weight of corn disposed to rest on the knife in the action of the machine.

F F are lower stationary curved guides and gatherers to the corn in its way to the knife or in the advance of the latter to the former.

G G' are upper guides and dividers, arranged on each side of the machine and extending from its front to or over the platform in the rear. These upper guides are made to conduct corn of different heights to its place by supporting said guides in rear and in front on pins passed through one of a vertical row of holes in each of four uprights or standards, $h\ h\ h\ h$, or are otherwise equivalently made adjustable as regards height. The horizontal reel D, the vertical shaft $d$ of which works through a boss in the one upper side guide, G, is also made adjustable as regards height, as shown by perforations made in its shaft for insertion of an under cross staying pin, so that said reel, whether arranged above or below the upper side guide, G, may be made to accord with the side guides, G G', in their adjustment as regards height, to secure a close and proper joint action of the reel and upper side guides on the corn.

The reel D, the function of which is well understood, is made of a series of suitably-curved wings, $i\ i\ i\ i\ i\ i$, united by tie-bars or guides $k\ k\ k\ k\ k\ k$, arranged so that the wings (which, radiating from the center bars of the wheel, curve backwardly) present considerably more surface or length on their convex faces from their outer extremities to their junction with the tie-bars than they present on their concave faces or backs from their outer extremities to their junction with the tie-bars at said backs. Such disposition of the tie-bars $k\ k\ k\ k\ k\ k$ serve to make said bars act as guides to prevent the corn from wrapping round the shaft of the reel and insuring its delivery in the rear on the platform in straight lines or courses corresponding to and parallel with the draft or thereabout.

The platform E is hung to rock or tilt, as shown by red lines in Fig. 2, so as to give it more or less inclination at pleasure, by suitably hinging or pivoting it for such action on a frame, H, which is adjustably connected with or seated on the main frame by legs $l$, arranged to enter or pass through slots in the main frame, and perforated so as to receive, at any required height, staying cross-pin $m$. Thus not only is the inclination of the platform variable, but also the height, whereby the platform may be more readily and perfectly adjusted to any level or inclination desired to suit up or down hill travel and rolling ground, or to suit the harvesting of corn or sugar-cane; and, to adapt it better to the harvesting of the latter and very tall corn, we provide said platform with a back extension-board, $n$, arranged to slide out from and in or under the platform to give increased or diminished length to the latter, as shown by black and blue lines in Fig. 2. The platform E has a lever, I, connected with it within easy reach of the driver when on his seat J, for him to tilt or adjust the platform; and to aid him in effecting this, also to aid him in holding the platform at a particular angle, the platform is provided with a branch or step, L, on which the driver's feet rest and press or not, at pleasure.

Beneath the driver's-seat portion of the frame the machine may be provided with a rear carrying-caster, M.

What we claim as our invention, and desire to secure by Letters Patent, is—

1. The combination with the vertically-adjustable upper guides, G G', of the vertically-adjustable reel D, for action together, as herein set forth.

2. The reel D, constructed with tangentially-set tie-bars or guides $k\ k$, as described, in combination with a platform on which the stalks fall parallel with the line of travel, substantially as and for the purposes set forth.

3. The combination, with the frame A and knife $C^2$, of the under adjustable frame A', substantially as and for the purposes set forth.

4. The manner herein shown and specified of connecting the platform E with the frame of the machine, for the purpose set forth.

5. Providing the platform E with a slide back extension-board, $n$, in the manner and for the purposes set forth.

6. The arrangement with an oblique or diagonal set spring blade or cutter, $C^2$, of a fixed obliquely-set carrying-wheel, C, in the manner and for the purpose set forth.

The above specification of our improved corn and cane harvester signed by us this 17th day of February, 1859.

ISAAC REAMER,
    HENRY MILLER.

Witnesses:
 S. H. CONRAD,
 A. J. RADER.